(12) United States Patent
Pugh et al.

(10) Patent No.: US 8,478,953 B2
(45) Date of Patent: Jul. 2, 2013

(54) BUFFER SNAPSHOTS FROM UNMODIFIABLE DATA PIECE TABLES

(75) Inventors: David Pugh, Redmond, WA (US); Jack Tilford, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 729 days.

(21) Appl. No.: 12/212,724

(22) Filed: Sep. 18, 2008

(65) Prior Publication Data
US 2010/0070721 A1      Mar. 18, 2010

(51) Int. Cl.
| G06F 8/71  | (2006.01) |
| G06F 9/52  | (2006.01) |
| G06F 12/00 | (2006.01) |
| G06F 12/16 | (2006.01) |

(52) U.S. Cl.
USPC ............... 711/162; 711/170; 711/E12.001; 711/E12.084; 711/E12.103

(58) Field of Classification Search
USPC ............... 711/162, 170, E12.001, E12.084, 711/E12.103
See application file for complete search history.

(56) References Cited

U.S. PATENT DOCUMENTS

| 5,182,806 A | 1/1993 | McKeeman et al. |
| 5,446,842 A | 8/1995 | Schaeffer et al. |
| 7,386,834 B2 | 6/2008 | Van De Vanter et al. |
| 7,895,666 B1 * | 2/2011 | Eshghi et al. .................... 726/30 |
| 2005/0071460 A1 * | 3/2005 | Mitchell et al. ............... 709/224 |
| 2005/0262432 A1 | 11/2005 | Wagner |

OTHER PUBLICATIONS

Shilling, John J., "Incremental LL(1) Parsing in Language-Based Editors", IEEE Transactions on Software Engineering, vol. 19, No. 9, Date: Sep. 1992, Concise Papers, pp. 935-940.

O'Brien, et al., "An Application Framework for Collaborative, Nomadic Applications", Rapport De Recherche Inria, Date: Oct. 2005, 26 Pages.

"Design and Implementation of a Win32 Text Editor", http://www.catch22.net/tuts/editor17.asp.

"Memory Management for Large-File Editors", http://www.catch22.net/tuts/bigmem02.asp.

Abela, Joaquin Cuenca, "Improving the AbiWord's Piece Table", Date: Jan. 4, 2003, http://e98cuenc.free.fr/wordprocessor/piecetable.html.

Crowley, Charles, "Data Structures for Text Sequences", Computer Science Department, University of New Mexico, Date: Jun. 10, 1998, pp. 1-29.

* cited by examiner

Primary Examiner — Mardochee Chery

(57) ABSTRACT

A snapshots data structure provides compilers and other tools with snapshots of a buffer at different points in time. Snapshot heads identify trees within a directed acyclic graph (DAG) of nodes. Leaf nodes of a given tree collectively hold data elements representing information that was resident in the buffer at a particular point in time regardless of subsequent editing of the buffer. During buffer editing operations a new tree is created in the DAG with leaf nodes holding data elements that match one-to-one a subsequence of data elements held by leaf nodes of an existing tree.

20 Claims, 7 Drawing Sheets

BUFFER SNAPSHOTS FROM UNMODIFIABLE DATA PIECE TABLES

BACKGROUND

Software developers use a variety of software tools when creating or modifying software programs. For example, an editor is a tool used to review and/or edit a program's source code. A source code analyzer is a tool used to check a program's source code for inconsistencies such as reading an uninitialized variable. A compiler is a tool used to translate a program's source code into executable code. A version controller is a tool used to manage different versions of source code, interpretable code, and/or executable code. A debugger is a tool used to test and debug other programs; debuggers often provide a view of the source code of the program that is being debugged. Developers also use other tools.

Sometimes software development tools are gathered into an Integrated Development Environment (IDE). An IDE is itself a software tool, which provides various other tools for software development in a coordinated manner. For example, a typical IDE includes at least a source code editor, a compiler and/or an interpreter, and a debugger. Some IDEs include a version controller, tools to automate building a complete program from libraries and other components, and/or tools to help create a graphical user interface. Some IDEs also have a class browser, an object inspector, and/or other tools designed specifically to help develop object oriented programs. IDEs are designed to improve developer productivity by providing coordinated tools that have similar user interfaces. An IDE may be tailored for use with a particular programming language, but some IDEs, such as the Microsoft® Visual Studio® Integrated Development Environment (marks of Microsoft Corporation), support development in several programming languages.

Source code and other editable information in documents is routinely changed, sometimes manually by a developer, and sometimes automatically by software. As a result, different versions of a document are often created. A tool may require access to a particular version of a document, or the tool may provide better results if the particular version is accessible. Accordingly, different tools may be required, or may at least be allowed, to simultaneously access different versions of a particular document.

SUMMARY

Snapshots of a buffer's content at different points in time are provided, without locking the buffer to pause editing, and without making a complete copy of the buffer. In some embodiments a snapshots data structure, which represents snapshots of the buffer at different points in time, includes a directed acyclic graph (DAG) of nodes. Snapshot heads identify trees within the DAG. Leaf nodes of a first tree collectively hold data elements representing information that was resident in the buffer at a particular point in time regardless of subsequent editing of the buffer. During find, copy-paste, and some other buffer editing operations a second tree is created in the DAG with leaf nodes holding data elements that match one-to-one a subsequence of data elements held by leaf nodes of the first tree. In some cases the second tree is created while making a partial copy of the first tree, subject to a pre-deletion and a post-deletion. In some cases the second tree is created while recursively traversing the first tree and concatenating results from subtree traversals.

The examples given are merely illustrative. This Summary is not intended to identify key features or essential features of the claimed subject matter, nor is it intended to be used to limit the scope of the claimed subject matter. Rather, this Summary is provided to introduce—in a simplified form— some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
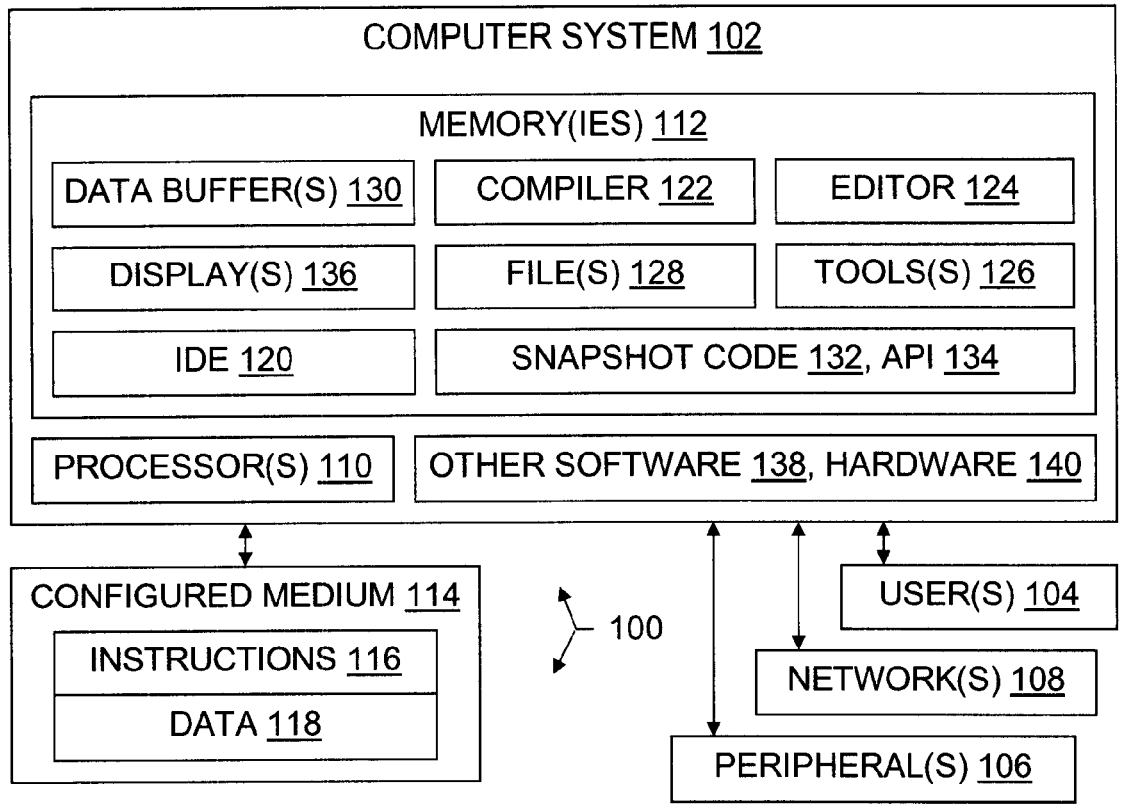
FIG. 1 is a block diagram illustrating a computer system having a memory configured with snapshot code in an operating environment, and also illustrating configured storage medium embodiments.

Compilers and other software development tools need stable images of the contents of an editor's text buffer. In the past, this has been accomplished in the Microsoft® Visual Studio® environment either by locking the text buffer, which prevents the user from typing in changes, or else by copying the entire text buffer, which can be expensive in terms of CPU and memory resources. (Microsoft® and Visual Studio® are marks of Microsoft Corporation.) Similar concerns may apply in fields other than software development whenever more than one user (human persons and/or programs) want or require access to a document without preventing changes to the document. The document's contents may be textual (prose and/or numbers), symbolic (e.g., math equations, chemical formulas), graphical, musical, or include other information.

Some editors use a data structure known as a piece table. A piece table keeps pieces of text from a buffer in spans. Each span holds a piece of the text, with the text characters in a given span stored in memory in the same order that the characters appear to a user. Pointers and/or other mechanisms allow an editor to display the spans in order, showing the characters in one span, then the characters in the next span, and so on, to display the text of multiple spans in the order the user expects.

Some embodiments discussed herein provide variations on a piece table data structure. One variation, called CompositeString, may be considered purely functional in the sense that editing operations (insert, delete, etc.) create a new CompositeString without modifying the original CompositeString. The CompositeString data structure allows tools to get a stable image of a text buffer's contents without preventing changes to the text buffer and without duplicating the contents of the buffer. The memory and CPU costs of creating the new CompositeString is low, as is the cost of access to the text contained within the CompositeString. This data structure may be used as underlying storage for an editor's text buffer, allowing the editor to expose an unmodifiable snapshot of the text buffer's contents at a particular point in time without preventing additional editing operations on the text buffer. By using CompositeString to expose snapshots of the text buffer's content at a particular point in time, the editor avoids locking the text buffer and avoids making a copy of the text buffer. An implementation of CompositeString can be efficient in terms of memory and CPU even when thousands of edits are being performed in the text buffer. An editor can use CompositeString to avoid storing deleted and inserted text as simple strings in an undo stack. An editor's implementation of Cut/Copy & Paste can use CompositeString to improve performance when manipulating large amounts of text. Similar features and considerations may apply with regard to other variations discussed herein; an editor using CompositeString is merely one example.

More generally, the CompositeString data structure provides an efficient representation of unmodifiable data when generating modified copies of a string. In some other approaches, the cost of inserting a character at the beginning of a string is proportional to the length of the string; because the original string cannot be modified, a copy of the entire string is needed. Likewise, the cost of getting a substring is proportional to the length of the substring. By contrast, these operations are O(log length of composite string) with a CompositeString data structure. Some compound operations, such as getting a substring and appending it, will tend to reuse portions of the CompositeString DAG, leading to even better memory performance.

It will be understood that even though some CompositeString examples involve an Integrated Development Environment, the uses of CompositeStrings are not limited to use within such environments.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

A "buffer" is a set of sequentially addressed memory locations.

A "data element" is an individual unit of editable information in a buffer. In a text editor, for example, data elements are typically individual characters, although larger tokens such as identifiers, numbers, and operators may also serve as data elements, e.g., after lexical analysis of source code. Data elements do not necessarily involve text characters; two other examples of data elements include a sequence of musical notes, and a sequence of video frames. Regardless, data elements which are stored in consecutively addressed memory locations are "physically contiguous", that is, they are located in a particular "physical order".

A "sequence" is an ordered set of data elements. A buffer contains data elements of a sequence, but the order in which the data elements are stored in memory is not necessarily the same as the order of appearance of the data elements in the sequence. The order in which data elements appear to a developer, a compiler, or another user is called the "logical order" of the sequence; data elements that appear consecutively are "logically contiguous".

A "subsequence" is a contiguous ordered subset of a sequence; context indicates whether the contiguity is logical and/or physical. A "span" is a subsequence in which all the data elements are both logically contiguous and physically contiguous. A given subsequence may coincide with the entire sequence, unless the subsequence is specifically designated a "proper" subsequence in which case the subsequence has fewer data elements than the sequence.

The term "snapshot data structure" refers to a data structure which represents data in a buffer at a particular point in time. In general, a snapshot data structure represents all buffered data at the particular time, but the term may also be used in discussing a subset of buffered data, such as data that is being cut or pasted. The term may also refer to a collection of snapshot data structures which represent different versions of a data buffer over time.

Data, such as part of a data structure, is "unmodifiable" if several conditions are satisfied. As an example, consider an unmodifiable node in a tree in a snapshot data structure. Changes are allowed in what points to an unmodifiable node. For instance, a second node may point to an unmodifiable node that was not previously pointed to at all, or was not previously pointed to by the second node. An unmodifiable node may be destroyed as a unit, e.g., during garbage collection to reclaim memory space after all users are done with the snapshots containing the node. Changes are not allowed within an unmodifiable node. For instance, change is not allowed in which node(s) and/or span(s) an unmodifiable node points to. Likewise, change is not allowed in which text (or other buffer data elements) an unmodifiable span holds.

Throughout this document, use of the optional plural "(s)" means that one or more of the indicated feature is present. For example, "span(s)" means "one or more spans" or equivalently "at least one span".

"Code" means processor instructions, data (which includes data structures), or both instructions and data.

Whenever reference is made to data or instructions, it is understood that these items configure a computer-readable memory, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more computer systems, which may be clustered, client-server networked, and/or peer-to-peer networked. Some operating environments include a stand-alone (non-networked) computer system.

Human users 104 may interact with the computer system 102 by using displays 136, keyboards, and other peripherals 106. A software developer is understood to be a particular type of user 104; end-users are also considered users 104. Automated agents may also be users 104. Storage devices and/or networking devices may be considered peripheral equipment in some embodiments. Other computer systems (not shown) may interact with the computer system 102 or with another system embodiment using one or more connections to a network 108 via network interface equipment, for example.

The computer system 102 includes at least one logical processor 110. The computer system 102, like other suitable systems, also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the memory 112/medium 114 in which they reside; when that memory is a functional part of a given computer system, the instructions 116 and data 118 also configure that computer system. It will be understood that memories 112 may be of different physical types, and that editors 124, tools 126, snapshot code 132, and other items shown in the Figures may reside partially or entirely within one or more memories 112, thereby configuring those memories.

In a given operating environment 100, whether within an Integrated Development Environment (IDE) 120 or otherwise, one or more compilers 122, editors 124, and/or other tools 126 will generally be present, and these tools will read and/or write files 128 that contain documents, namely, editable information. An operating system and other software 138 and hardware 140 other than that already enumerated may also be present.

The illustrated configuration includes an Integrated Development Environment 120 which provides a developer with a set of coordinated software development tools. In particular, some of the suitable operating environments for some embodiments include a Microsoft® Visual Studio® development environment (marks of Microsoft Corporation) configured to support source code development according to the teachings herein. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development that involve document editing.

More about CompositeString

Examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

Although a given embodiment does not necessarily involve a CompositeString or a text editor, additional information about CompositeString may be helpful in understanding embodiments. The use of CompositeString in a text editor is now discussed in greater detail, as one of many possible examples.

In one embodiment, an editor 124 text buffer 130 uses CompositeString snapshot code 132 to store the entire contents of the text buffer. Other tools 126, such as compilers 122, can get a reference to the text buffer's CompositeString at any time, and the CompositeString they see will not change. Operations that modify the text buffer 130 create a new CompositeString that reflects the modification, and the new CompositeString that represents the current contents of the text buffer.

The CompositeString snapshot code 132 is an implementation of a piece table using a functional, balanced binary tree. Because the CompositeString is a functional data structure, each CompositeString exposed by the text buffer represents an unmodifiable snapshot of the text buffer's contents at a specific point in time. In addition, because the CompositeString is based on a balanced binary tree, good performance (O(log number of pieces)) is possible when accessing the text contained in the buffer.

The implementation of the CompositeString uses two different types of CompositeString nodes. Leaf nodes correspond to a span of text that is stored in a C-Sharp string, e.g., a leaf node holds a source string and the text span's starting and ending positions in the source string. Other implementations may use different string representations. Intermediate nodes are a logical equivalent of concatenating two CompositeStrings, containing the left and right children, aggregate length (number of data elements) of the children's spans, and the intermediate node's height in the tree.

Figure 5:
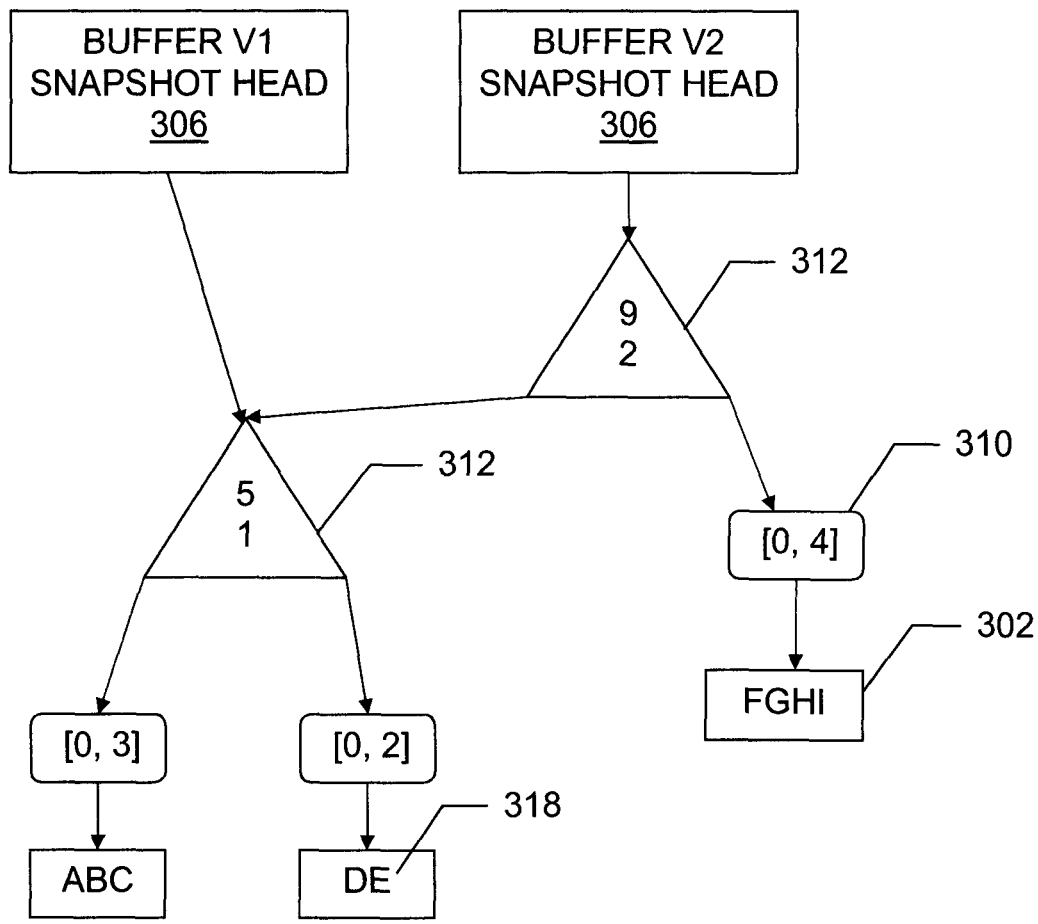
FIG. 5 is a diagram illustrating a directed acyclic graph of a particular snapshots data structure, illustrating a simple concatenation.
Figure 6:
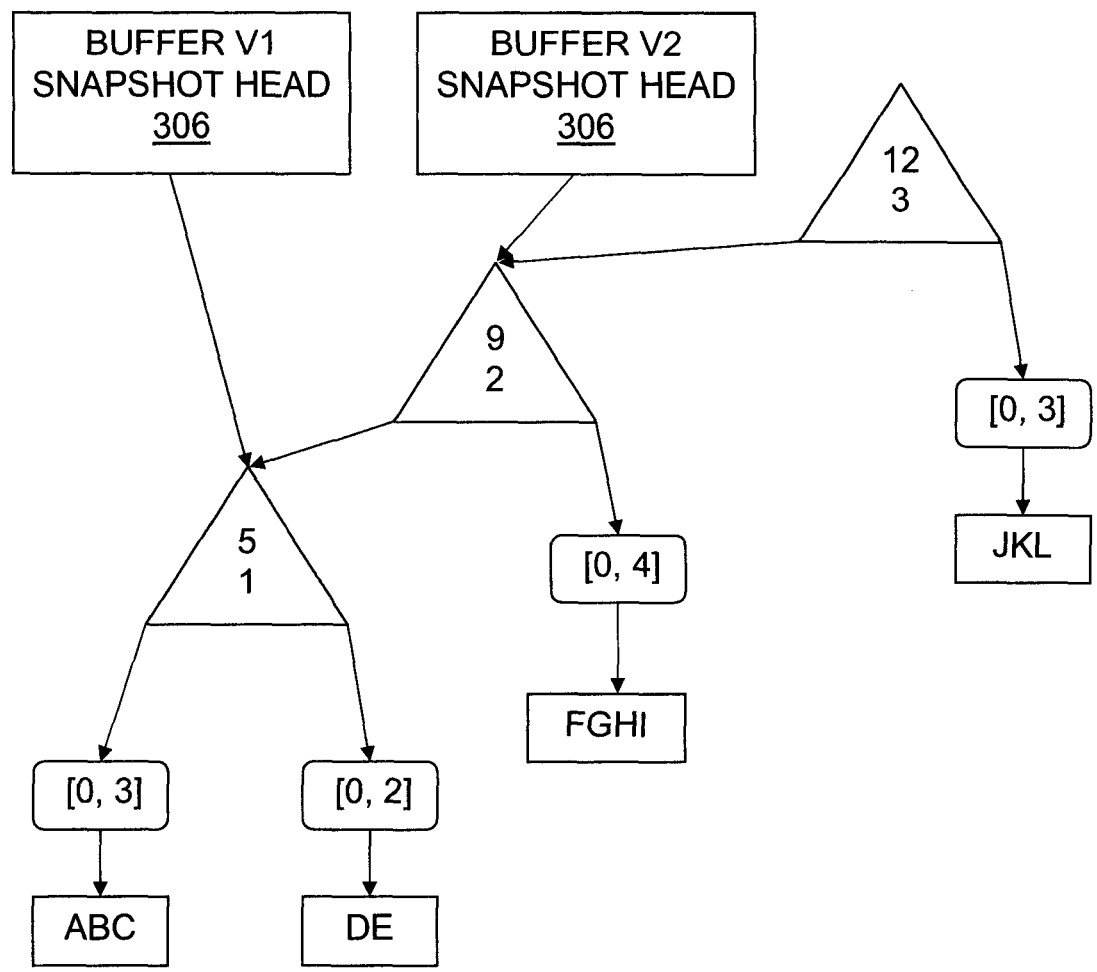
FIG. 6 is a diagram illustrating the snapshots data structure of FIG. 5 during a complex concatenation prior to tree rebalancing.
Figure 7:
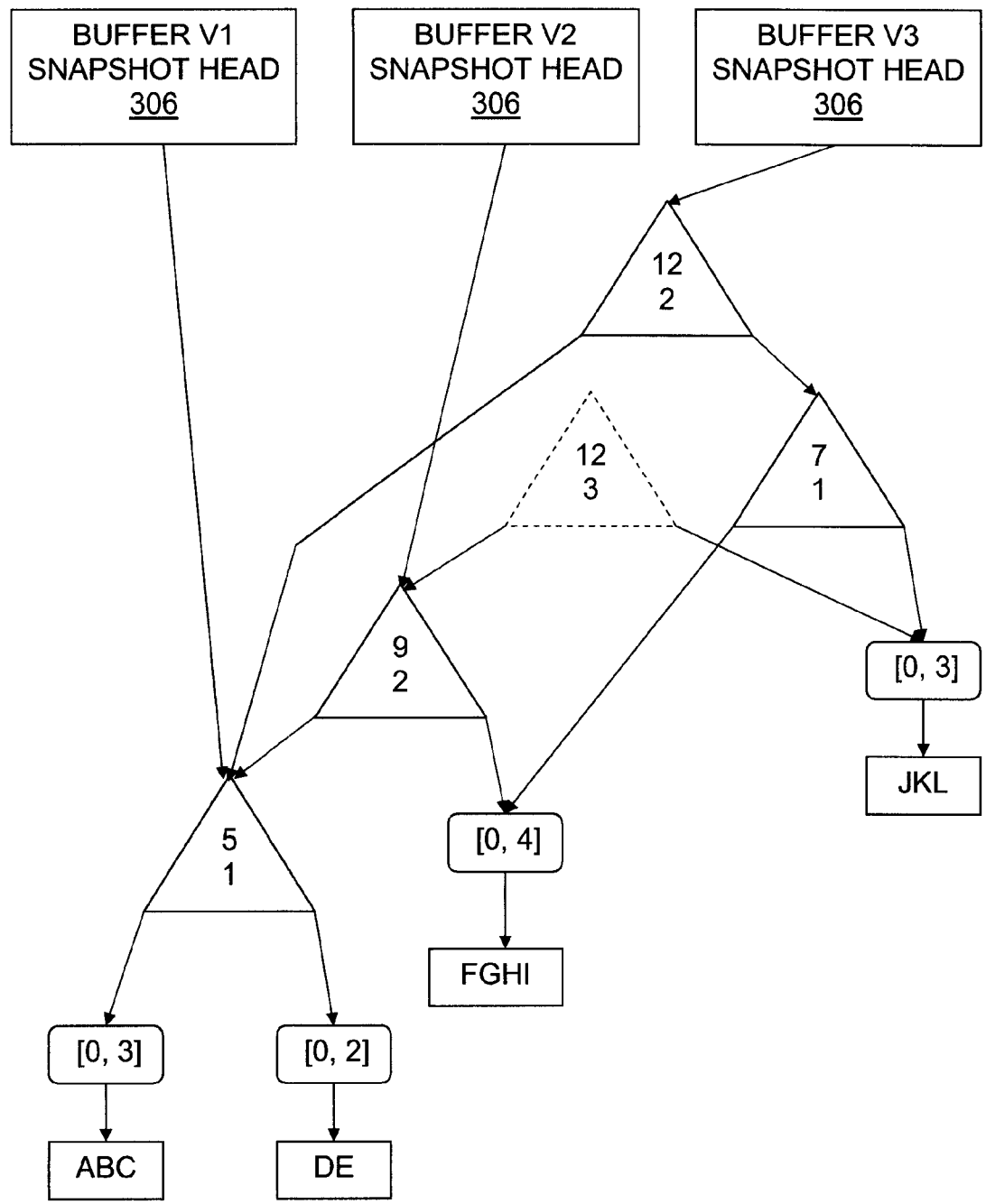
FIG. 7 is a diagram illustrating the snapshots data structure of FIG. 6 during complex concatenation after tree rebalancing.
Figure 8:
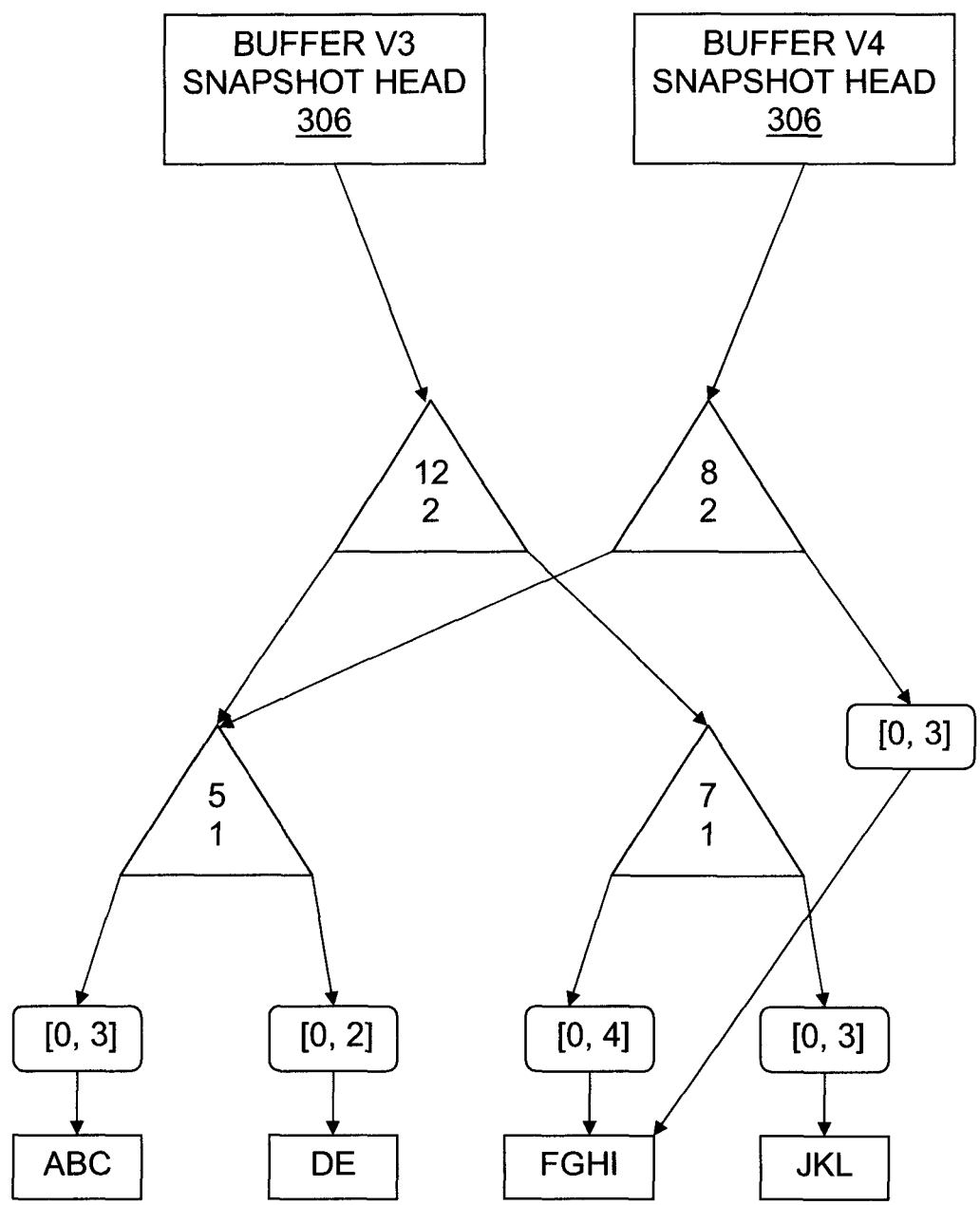
FIG. 8 is a diagram illustrating a portion of the snapshots data structure of FIG. 7 after a deletion editing the buffer.

The basic editing operations on a CompositeString are concatenating two CompositeStrings and getting a substring of a CompositeString; other editing operations can be composed from these two primitives. For example, inserting into the middle of the buffer can be done by getting the substring for the first half, getting the substring for the second half, concatenating the first half and the inserted string, and concatenating the result with the second half. Concatenating two CompositeStrings is accomplished by creating a new intermediate node whose children are the two strings to concatenate, and rebalancing if needed; FIGS. 5 to 7 illustrate an example which is discussed later herein. Getting a substring of a CompositeString depends on whether the string is represented as an intermediate node or a leaf node, as illustrated by FIG. 8, which is also discussed later herein.

In one implementation, the get-substring operation for intermediate nodes either returns the entire intermediate node or recursively applies itself to the left and/or right children, creating a new intermediate node and rebalancing the tree if necessary. For leaf nodes, the get-substring operation either returns the entire leaf node or returns a new leaf node that has a different start and end but the same source string.

In many situations, a CompositeString created by applying an editing operation to a source CompositeString will reuse parts of the data structure used to represent the source. As a result, memory is conserved even when thousands of edits are applied to the text buffer. A CompositeString will be retained as long as some tool 126 is using it, and is then subject to garbage collection.

Undo systems for a text editor may use strings to make a copy of the text inserted or deleted by the user, so that the editing operation can be undone or redone. Using string copies becomes more resource-hungry when the size of the edit is very large, such as when a user deletes all the text in a large buffer 130. Using CompositeStrings instead of other strings provides the same functionality to users, but with much better CPU and memory performance when the user edits a buffer to copy a large string.

Cut/Copy and Paste commands can also take advantage of CompositeStrings to improve performance when manipulating large amounts of text. Copying and Pasting the entire text buffer 130, for example, only increases the memory required to store the text buffer by a small amount, because the "copy" would be represented as a new intermediate node whose two children are the same CompositeString, that is, the CompositeString which defined the contents of the text buffer prior to the Paste operation.

The Cut/Copy and Paste and Undo efficiencies discussed above generally extend to embodiments that use an implementation other than the CompositeString implementation. Likewise, the ability to define operations in terms of concatenation and get-substring primitives generally extends beyond CompositeString. Other aspects of CompositeString are perhaps less likely to be found many embodiments, such as using C-Sharp strings, tracking aggregate length in intermediate nodes, using binary trees, and using balanced trees.

Systems

Figure 2:
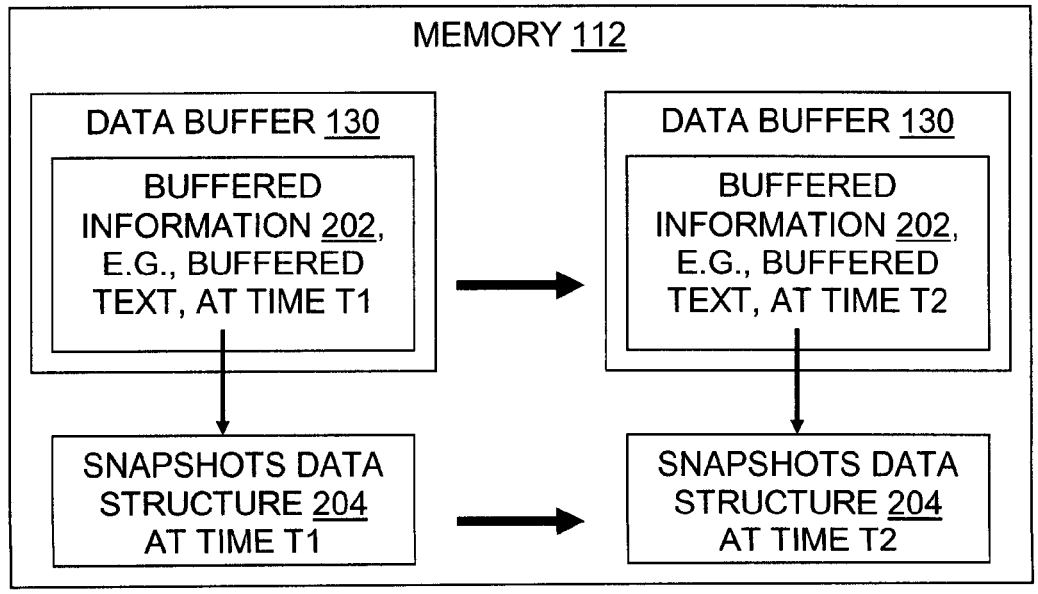
FIG. 2 is a block diagram further illustrating a data buffer, and a snapshots data structure within the snapshot code shown in FIG. 1.
Figure 3:
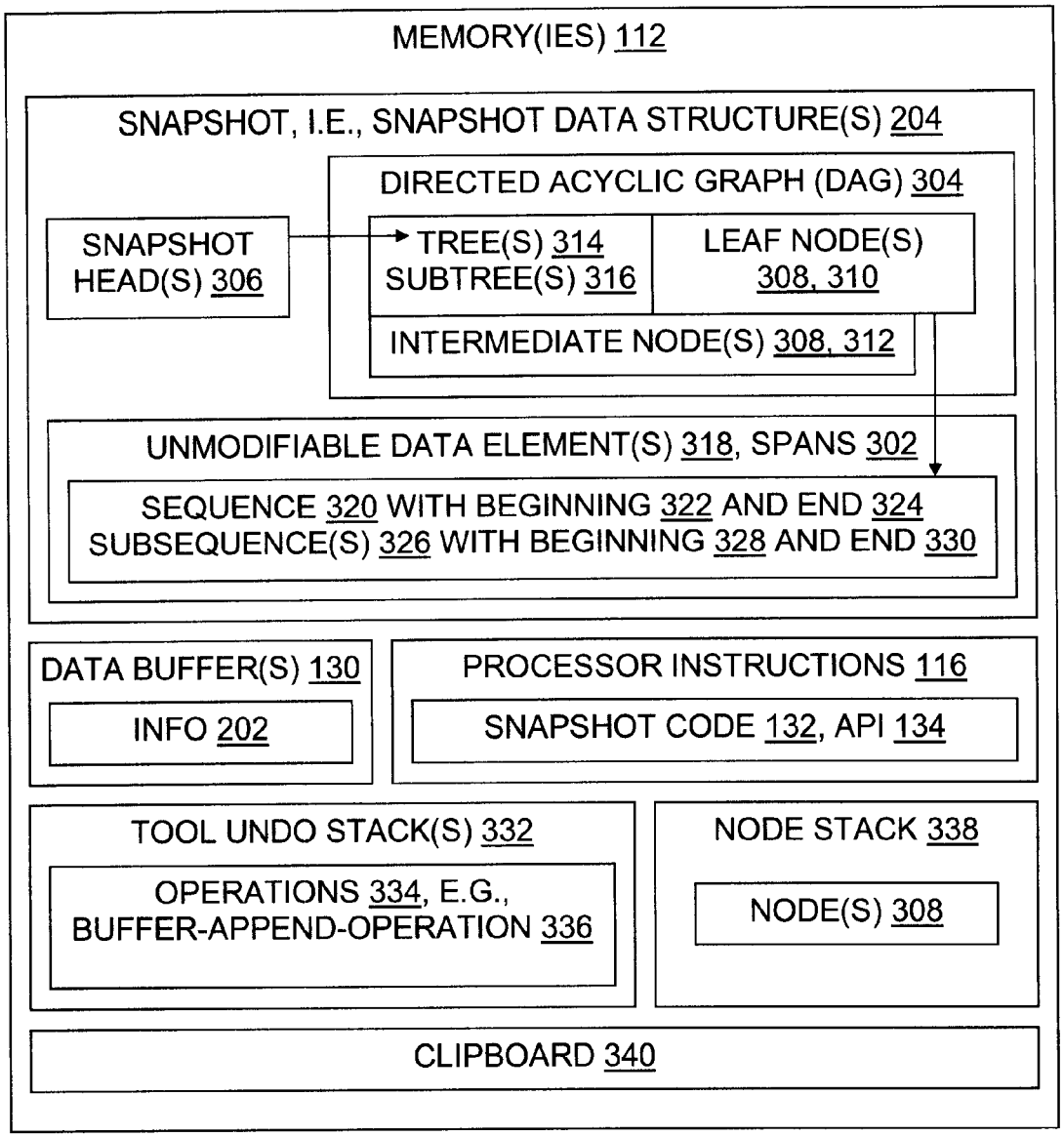
FIG. 3 is a block diagram further illustrating snapshot code, data buffers, and other items configuring a memory shown in FIG. 1.

Referring now to FIGS. 1 through 3, some embodiments provide a computer system containing a program such as a compiler 122, editor 124, or other tool 126 which accesses editable information. A memory 112 contains data in the form of a snapshot data structure 204 of data elements 318 in a buffer 130 of the program. A processor 110 in operable communication with the memory 112 performs processor instructions to create a tree 314 in the snapshot. In particular, the snapshot is generated at least in part by running processor instructions in snapshot code 132. Snapshot code may include data structures and/or processor instructions. An Application Program Interface (API) 134 may be part of the snapshot code 132.

In some embodiments, the snapshot code 132 used a first tree 314 of a directed acyclic graph (DAG) 304 to create in the DAG a second tree 314 having nodes 308. Unmodifiable leaf nodes 310 have unmodifiable spans 302 that hold data elements matching one-to-one a subsequence 326 of data elements held by spans of leaf nodes of the first tree. In some embodiments, one or more of the trees 314 are binary trees, in some embodiments trees 314 are balanced trees, and in some embodiments trees 314 are balanced binary trees. As used herein, "binary tree" does not require that all descendants of a given intermediate node are distinct from one another; for instance, both children of an intermediate node could be the same node. Tree balancing is not always required, but is an optimization that may help an implementation provide consistent performance even in extreme scenarios.

In some embodiments, the snapshot 204 is generated at least in part by forming a partial copy of the first tree while making two specialized deletions, namely, a pre-deletion to exclude data elements 318 preceding the subsequence and a post-deletion to exclude data elements 318 following the subsequence. The data elements 318 held by spans 302 of leaf nodes 310 of the first tree form a sequence 320 which has a beginning 322 and an end 324. The subsequence 326 being "copied" (copied from the user's perspective, but not fully duplicated in memory) also has a beginning 328 and an end 330, which do not necessarily coincide with the sequence 320 beginning 322 and/or the sequence 320 end 324. The pre-deletion corresponds to data elements between the beginning of the sequence 320 and the beginning of the subsequence 326, including the beginning of the sequence and excluding the beginning of the subsequence. The post-deletion corresponds to data elements between the end of the subsequence 326 and the end of the sequence 320, excluding the end of the subsequence and including the end of the sequence.

In the foregoing, and in other discussions herein of deletion within the DAG, it will be understood that deletion of a subsequence does not require or typically involve freeing memory that held the subsequence, although memory might be freed while moving the subsequence to a different physical memory location as part of garbage collection. An unmodifiable subsequence is not deleted by freeing its memory for other use, because merely freeing the memory—thereby losing the subsequence data—would likely make the snapshots data structure fail to perform as designed. In particular, recovery of earlier buffer versions would be compromised or made impossible. Rather, the subsequence is deleted by creating a tree within the DAG that does not reference the subsequence. The subsequence data elements remain in memory 112, available for use in providing previous versions of the buffer, but the deleted data elements are not linked in as part of the tree that represents the buffer 130 after deletion of those data elements.

In some embodiments, the snapshot 204 is generated at least in part by traversing the first tree to create the second tree, and concatenating certain data elements 318 during the traversal. When an intermediate node 312 is reached during traversal of a binary tree 314, for example, the traversal continues only in the left subtree 316 rooted at that intermediate node if the entire subsequence 326 is held in spans 302 of the left subtree. If the entire subsequence is held in spans of the right subtree 316, then traversal continues only in the right subtree. If the subsequence is held in both the left subtree and the right subtree then traversal continues in each subtree and the results from the two subtree traversals are concatenated. When a leaf node 310 is reached, a result is returned in the form of a new leaf node with a span that holds the intersection of the subsequence with the data elements held by the span of the leaf node that was reached.

Other approaches may also be used to generate the snapshots data structure 204, in addition to or in place of the deletions approach and the recursive traversal with concatenation approach described herein. A snapshots data structure 204 may internally share spans rather than duplicating significant parts of a buffered string, regardless of the approach used to generate that snapshots data structure 204.

In some embodiments, a tree 314 in the DAG shares at least one leaf node 310 and/or at least one intermediate node 312 with at least one binary tree in the DAG. In FIG. 5, for example, the two trees identified by buffer v1 snapshot head and buffer v2 snapshot head, respectively, share one intermediate node (depicted as a triangle containing the numbers 5 and 1) and also share the two leaf nodes depending from that intermediate node.

In some embodiments, two leaf nodes 310 each reference the same unmodifiable span 302 of data elements 318. In FIG. 8, for example, two leaf nodes reference the span that contains FGHI. Although some embodiments have data elements 318 in the buffer 130 that represent user-generated text, buffered data elements may also or alternatively represent automatically-generated text, for example.

In some binary tree embodiments, each intermediate node 312 includes a left link, namely, a pointer, address, handle, index, or other mechanism, which identifies a left child node 308 if one is present. Similarly, the intermediate node includes a right link identifying a right child node 308 if one is present.

In some balanced tree embodiments, each intermediate node 312 includes a height, namely, an indication of the maximum number of nodes on any path from the intermediate node to any leaf node within a subtree rooted at the intermediate node. A tree is balanced when the difference in heights of the children of each node is within a specified tolerance; in the example of FIGS. 6 and 7 the height tolerance is one, but other embodiments may use a different height tolerance to determine when a tree is balanced.

In some embodiments, each intermediate node 312 includes an aggregate length indicating the aggregate number of data elements held by all leaf nodes of the subtree rooted at the intermediate node. FIG. 5 shows an example in which each of these aspects occurs. The intermediate node 312 depicted by the triangle containing a 9 and a 2, for example, has a left link to another intermediate node, a right link to a leaf node holding the FGHI span, an aggregate length of 9, and a height of 2. In other embodiments, one or more of these aspects of an intermediate node is omitted or implemented differently, e.g., by splitting the aggregate length into a left subtree aggregate length and a right subtree aggregate length.

One of the many possible API 134 implementations uses classes System, System.Collections.Generic, System.Text, System.Globalization, System.Collections, and System.IO in the Microsoft.VisualStudio.Text.Implementation namespace. This API includes code such as the following:

```
internal interface ICompositeString: IComparable<
ICompositeString>,
IEnumerable<char>, IEquatable< ICompositeString>
    {
        int Length { get; } /// Number of characters in this
        int LineBreakCount { get; }
        int GetLineNumberFromPosition(int position); ///
zero-based
        LineSpan GetLineFromLineNumber(int lineNumber);
        int CompareTo(ICompositeString other, bool
ignoreCase, CultureInfo culture);
        char this[int index] { get; }
        string GetText(Span span);
        char[ ] ToCharArray(int startIndex, int length);
        void CopyTo(int sourceIndex, char[ ] destination, int
destinationIndex, int count);
        void Write(TextWriter writer, Span span);
        ICompositeString Substring(Span span);
/// Create ICompositeString equivalent to inserting text in
this
        ICompositeString Insert(int position, string text);
        ICompositeString Insert(int position,
ICompositeString text);
/// Create ICompositeString equivalent to deleting text from
this
        ICompositeString Delete(Span span);
/// Create a new ICompositeString equivalent to replacing a
contiguous span of characters
        ICompositeString Replace(Span span, string text);
        ICompositeString Replace(Span span, ICompositeString
text);
    }
}
```

In some embodiments, peripherals 106 such as human user I/O devices (screen, keyboard, mouse, microphone, speaker, motion sensor, etc.) will be present in operable communication with one or more processors 110 and memory 112. However, an embodiment may also be deeply embedded in a system, such that no human user 104 interacts directly with the embodiment.

In some embodiments, networking interface equipment provides access to networks 108, using components such as a packet-switched network interface card, a wireless transceiver, or a telephone network interface, for example, will be present in the computer system. However, an embodiment may also communicate through direct memory access, removable nonvolatile media, or other information storage-retrieval and/or transmission approaches, or an embodiment in a computer system may operate without communicating with other computer systems.

Methods

Figure 4:
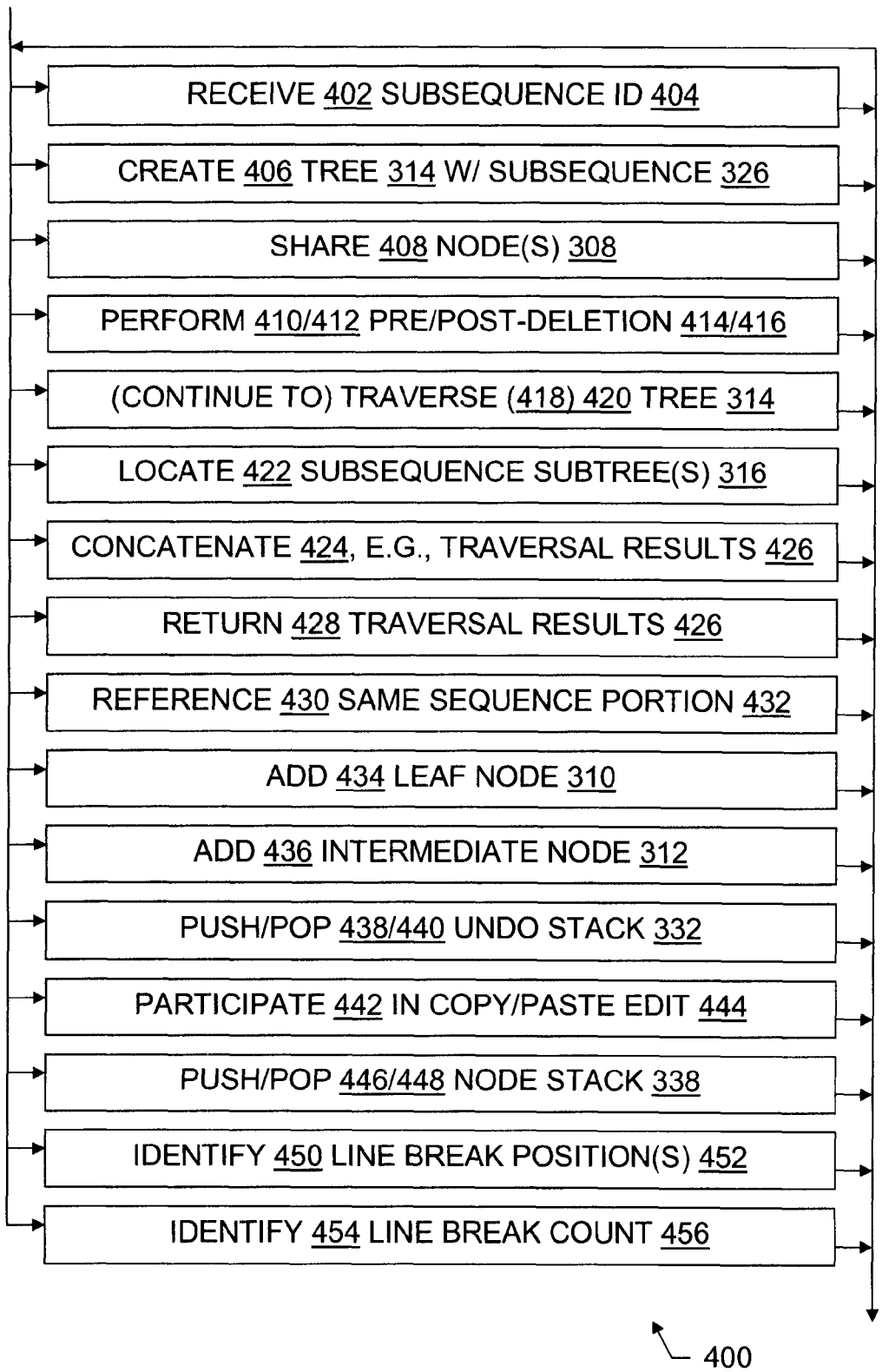
FIG. 4 is a flow chart illustrating steps of some method and configured storage medium embodiments.

FIG. 4 illustrates some method embodiments in a flowchart 400. In a given embodiment zero or more illustrated steps of a method may be repeated, perhaps with different parameters or data to operate on. Steps in an embodiment may also be done in a different order than the top-to-bottom order that is laid out in the Figure. Steps may be performed serially, in a partially overlapping manner, or fully in parallel. The order in which flowchart 400 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

During a receiving step 402, an embodiment receives an identification 404 of a subsequence 326 of data element(s) 318 held by unmodifiable span(s) 302 of leaf node(s) 310 of a first tree 314 of a directed acyclic graph (DAG) 304. The subsequence may be identified by links, by a pattern or template, by an exemplar, or by another mechanism.

During a creating step 406, an embodiment creates in the DAG a second tree. "Second" and "first" are used herein simply to distinguish between different items, and thus do not necessarily refer to time, position, or priority. The second tree 314 shares at least one unmodifiable leaf node with the first tree. The leaf node(s) of the second tree hold unmodifiable span(s) having data element(s) matching one-to-one the identified 404 subsequence.

During a sharing step 408, which may occur during, or as a result of, the creating step 406, one or more nodes 308 are shared by two or more trees 314 in the DAG 304. Sharing nodes and/or spans is optional. For example, in some embodiments if a user deletes the entire buffer, or replaces it with different text, then the resulting "after" snapshot will not contain any of the intermediate nodes from the "before" snapshot.

During a pre-deletion performing step 410, an embodiment performs a pre-deletion 414 which excludes from a second tree data element(s) between the beginning 322 of a sequence 320 and the beginning 328 of a subsequence 326. The term "between" in step 410 means that in general, the beginning of the sequence is excluded, but in the special case where the sequence beginning 322 coincides with the beginning of the subsequence 326, the shared beginning 322, 328 data element is not excluded.

During a post-deletion performing step 412, an embodiment performs a post-deletion which excludes from a second tree data element(s) between the end 330 of a subsequence 326 and the end 324 of a sequence 320. The term "between" in step 412 means that in general, the end of the sequence is excluded, but in the special case where the sequence end 324 coincides with the end of the subsequence 326, the shared end 324, 330 data element is not excluded.

Pre-deletion and post-deletion performing steps 410, 412 are discussed further below, after the introduction of steps for pushing and popping a node stack 338.

During a traversing step 420, a recursive traversal of a tree 314 is performed by an embodiment. In particular, during a traversal continuing step 418 within traversing step 420, traversal continues from an intermediate node 312 into a subtree 316 rooted at the intermediate node.

During a locating step 422, an embodiment locates subtree(s) 316 that include at least a portion of a subsequence 326. Locating step 422 may be part of tree traversing step 420. Examples of locating step 422 are discussed below in connection with FIGS. 5 through 8.

During a concatenating step 424, an embodiment concatenates subsequences. For instance, concatenating step 424 may concatenate subsequence results 426 that are returned 428 during tree traversing step 420 while forming a tree that holds an identified 404 subsequence 326. Examples of concatenating step 424 are discussed in connection with FIGS. 5 through 8.

During a result returning step 428, an embodiment returns a result, in the form of a span or subsequence, during tree traversing step 420. Examples of returning step 428 are discussed in connection with FIGS. 5 through 8.

During a shared referencing step 430, which may occur during or as a result of creating step 406, one or more nodes 308 reference the same span 302 or portion 432 of a span 302. As a result, memory is not needed for a copy of the shared span. An example appears in FIG. 8.

During a leaf node adding step 434, an embodiment adds a leaf node 310 to a tree 314. Examples of leaf node adding step 434 are discussed in connection with FIGS. 5 through 8.

During an intermediate node adding step 436, an embodiment adds an intermediate node 312 to a tree 314. Examples of intermediate node adding step 436 are discussed in connection with FIGS. 5 through 8.

During an undo stack pushing step 438, an embodiment pushes onto an undo stack 332 an item representing a buffer editing operation 334, such as a buffer-append-operation 336 representing an edit which appends a data element to the contents of the buffer 130. An undo stack 332 is a history of at least some of the editing operations performed on a buffer 130. A user undoes an editing action by performing a new editing action that is the opposite of the original action. For instance, the opposite of deleting a block of text is to insert the deleted text. Accordingly, the undo stack maintains at least a logical copy (possibly a physical copy as well) of deleted buffer content. In practice, undo systems typically also maintain a logical copy of inserted text because a user can undo an insertion, causing the text to be deleted, and then redo the insertion, causing the text to be inserted again. The second insertion operation is facilitated if the undo stack remembered the text that was deleted by the undo; generally, this is easiest to do by making a logical copy at the time of the original insertion.

During an undo stack popping step 440, an embodiment pops a buffer editing operation 334 off of an undo stack 332, by popping an item previously pushed 438 onto the undo stack 332.

During a copy/paste participating step 442, an embodiment participates in a Copy/Paste edit 444 of the contents of a buffer 130. The user performing the edit 444 may be a human user or an automated software agent, for example.

During a node stack pushing step 446, an embodiment pushes an item representing a node 308 onto a node stack 338. The pushed item may be a node 308, or a link to a node, for example.

During a node stack popping step 448, an embodiment pops a node 308 off of a node stack 338, by popping an item previously pushed 446 onto the node stack 338.

One approach to performing specialized deletions 414, 416 uses a node stack 338 as in a manner described below. A text buffer is used in this example but other types of data elements 318 can be processed similarly.

A post-deletion 416 may be performed 412 at a time before or after the time of a pre-deletion 414; performance of the two deletions 414, 416 could also overlap in a multithreaded system. The post-deletion deletes text from the end of a desired substring (subsequence 326) to the end of the string (sequence 320). To accomplish post-deletion, the embodiment finds the path from the tree root (accessed by a snapshot head 306) to the leaf node that contains the end of the desired substring, and stores the nodes of that path in the node stack 338. Then the embodiment pops 448 the top node off the stack 338; this will be the leaf node 310 that contains the end of the desired substring. Then the embodiment creates a new leaf node that contains the text in the popped leaf node up to the end of the desired substring; we call this new leaf node the temporary root. While the stack is not empty, the embodiment pops the stack (this will be an intermediate node); determines whether the end of the desired substring is contained by the popped node's right child and if it is creates a new intermediate node that contains the popped node's left child as the new intermediate node's left child and the temporary root as the new intermediate node's right child; makes this new intermediate node the temporary root; and repeats. The string defined by the resulting temporary root corresponds to the original string up to the end of the desired substring.

The pre-deletion 414 deletes from the beginning of the string to the beginning of the desired substring, as follows. The embodiment finds the path from the root to the leaf node that contains the beginning of the desired substring, and stores the path's nodes in a node stack 338. Then the embodiment pops 448 the top node off the stack; this will be the leaf node that contains the beginning of the desired substring. The embodiment creates a new leaf node that contains the text in the leaf node starting at the beginning of the desired substring; this new leaf node is the temporary root. While the node stack is not empty, the embodiment pops the stack (this will be an intermediate node), and then if the end of the desired substring is contained by the popped node's left child, the embodiment creates a new intermediate node that contains the temporary root as its left child and the popped node's right child as its right child, and makes this new intermediate node the temporary root.

During a line break position identifying step 450, an embodiment identifies line break position(s) 452 by storing the position(s) in at least one intermediate node 312. Positions may be implemented as links, e.g., pointers or indexes.

During a line break count identifying step 454, an embodiment identifies line break count(s) 456 by storing the count(s) in at least one node 308. Some embodiments store line break information (positions and/or counts) in leaf nodes 310. Some embodiments store an aggregate line break count in intermediate nodes 312. Storing the line break and aggregate line break counts can provide an efficient mechanism for accessing a piece table using {line number, column} coordinates rather than absolute buffer position, and may be helpful when the buffer contains numeric or other data in tabular form, instead of or in addition to containing prose text.

Some embodiments receive 402 an identification 404 of a subsequence of data element(s) held by unmodifiable span(s) of leaf node(s) of a first tree of a directed acyclic graph (DAG). The embodiments then create 406 in the DAG a second tree whose leaf node(s) hold unmodifiable span(s) having textual data element(s) matching one-to-one the identified subsequence. The second tree may share at least one unmodifiable leaf node with the first tree.

As part of creating 406 a second tree, some embodiments include performing 410 a pre-deletion which excludes from the second tree data element(s) between the beginning of the sequence and the beginning of the subsequence, and performing 412 a post-deletion which excludes from the second tree data element(s) between the end of the subsequence and the end of the sequence.

Some embodiments include traversing 420 a first binary tree and creating 406 a second binary tree as a logical copy of a subspan of the first tree, in steps that include the following:
when an intermediate node is reached:
if the subsequence matches an entire span of the intermediate node then return the intermediate node as result and stop traversal;
if the entire subsequence is held in span(s) of the left subtree of the intermediate node then continue traversal only in the left subtree;
if the entire subsequence is held in span(s) of the right subtree of the intermediate node then continue traversal only in the right subtree; and
if the subsequence is held in both the left subtree and the right subtree then continue traversal in each subtree and then concatenate results from the two subtree traversals; and
when a leaf node is reached, return as a result a new leaf node with a span that holds the intersection of the subsequence with the textual data elements held by the span of the leaf node that was reached.

More generally, some embodiments include traversing 420 a first tree (which is not necessarily a binary tree) and creating 406 a second tree (also not necessarily a binary tree) in steps that include the following:
when an intermediate node is reached:
if the subsequence matches an entire span of the intermediate node then return the intermediate node as result and stop traversal;
if the entire subsequence is held in span(s) of a subtree of the intermediate node then continue traversal only in that subtree; and
if the subsequence is held in span(s) of multiple subtrees then continue traversal in each of those subtrees and concatenate results from those subtree traversals;
when a leaf node is reached, return as a result a new leaf node with a span that holds the intersection of the subsequence with the data elements held by the span of the leaf node that was reached.

Some embodiments include adding 434 a new leaf node 310 to the DAG 304, the new leaf node having a span 302 holding at least one textual data element 318 that is being appended to the text buffer 130. An example of leaf node adding step 434 is discussed in connection with FIGS. 6 and 7 below.

Some embodiments include pushing 438 an operation onto an undo stack. For instance, some push 438 a buffer-append-operation 336 onto an undo stack 332. Step 438 could be done, for example, in conjunction with adding 434 a new leaf node 310 to the DAG 304 when the new leaf node's span 302 holds data element(s) being inserted by an editing operation 334 in the buffer 130.

In some embodiments, a method traverses 420 a first tree 314 of the snapshots DAG in conjunction with a Copy/Paste edit of a text buffer 130. Nodes 308 may be reused (shared) as part of the Copy/Paste implementation.

For example, suppose a user 104 wishes to move a block of source code from a buffer A that represents one document file 128 to a buffer B that represents another document file 128. The user would open file/buffer A; select the block of source code to be moved; cut the block; open file/buffer B; move the cursor to the desired insertion location; and paste the block. In this scenario, with the cut operation 334 the editor 124 would make a logical copy of the selected text 202; add the logical copy to a clipboard 340; push 438 the logical copy to an undo stack 332 as a delete operation 334 on buffer A; and delete the selected text 202 from buffer A by getting the pre-deletion 414 substring (subsequence) that corresponds to the portion of buffered text (sequence) from the start of the buffer to the start of the selection, getting the post-deletion 416 substring (subsequence) that corresponds to the text from the end of the selection to the end of the buffer, and concatenating 424 the results, namely, the pre-deletion 414 and the post-deletion 416.

With the paste operation 334 the editor 124 would extract the text to be inserted from the clipboard 340; insert the text into buffer B by getting a pre-deletion substring of buffer B that corresponds to the text from the start of buffer B to the insertion point, getting a post-deletion substring that corresponds to the text from the insertion point to the end of buffer B, concatenating 424 the pre-deletion substring with the text from the clipboard 340, and concatenating that result with the post-deletion substring. The editor would also make a logical copy of the inserted text and push 438 that logical copy onto the undo stack 332 as an insert operation 334 on buffer B. In this example, the snapshots data structure 204 allows the time and memory cost of making a logical copy, deleting the text, and inserting the text to be O(log buffer size). Without the snapshots data structure 204, the operations are all O(length of the selected text).

Configured Media

Some embodiments include a configured computer-readable storage medium 114, which is an example of a memory 112. Memory 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory 112, which may be removable or not, and may be volatile or not, can be configured into an embodiment using components such as a DAG 304 and other snapshot code 132 in the form of data 118 and instructions 116, read from a removable medium 114 and/or another source such as a network connection, to form a configured medium, namely, a configured memory 112 which is capable of causing a computer system to perform method steps for providing access to snapshots of a buffer 130 without preventing buffer editing while a snapshot is in use as disclosed herein. FIGS. 1 through 4 thus help illustrate configured storage media embodiments and method embodiments, as well as system and method embodiments. In particular, any of the method steps illustrated in FIG. 4, or otherwise taught herein, may be used to help configure a storage medium to form a configured medium embodiment.

Additional Examples

Not every item shown in the Figures need be present in every embodiment. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Remembering that embodiments are not limited to the examples given herein, we now consider examples illustrated in FIGS. 5 through 8.

FIG. 5 shows an implementation of a DAG 304 which has two snapshot heads 306, labeled "BufferV1" and "BufferV2" for version 1 and version 2 of a text buffer 130, respectively. Version 1 of the buffer contains the string "ABCDE", which is represented as an intermediate node 312 that is identifiable in FIG. 5 by the values it contains, namely, an aggregate length of subtree strings=5, and a height in the tree=1. The intermediate node joins two leaf nodes 310. One leaf node is identified by a {start index, character count} pair [0,3] and a span 302 holding the string "ABC", and the other leaf node is identified by a {start index, character count} pair [0,2] and a span 302 holding the string "DE". To version 1 of the buffer, a user appends "FGHI", which is represented by adding 434 a new leaf node. The new leaf node is identified by a {start index, character count} pair [0,4] and a span 302 holding the string "FGHI". The resulting DAG includes an intermediate node (length 9, height 2) that joins the original intermediate node and the new leaf node. The new CompositeString represents the contents of version 2 of the buffer 130.

FIG. 6 shows the FIG. 5 DAG after the user appends the string "JKL" to version 2 of the buffer. To update the DAG accordingly, the first step (as in FIG. 5) is to create a new intermediate node that joins the current contents of the buffer with the newly inserted text. The newly added 436 intermediate node is identified in FIG. 6 by the values length=12 and height=3, and is denoted "the 12-3 node" in this discussion. The resulting tree is unbalanced; in the 12-3 node the height of the left child is 2 and the height of the right child is 0. The tree will be rebalanced in order to promote good performance.

As shown in FIG. 7, this rebalancing involves adding 436 two new intermediate nodes to replace the unbalanced 12-3 node. The first of these new intermediate nodes is a 7-1 node that joins the right child of the left child of the 12-3 node with the right child of the 12-3 node. The second new intermediate node, the 12-2 node, joins the left child of the left child of the 12-3 node with the new 7-1 node. The resulting tree is balanced, and becomes the contents of version 3 of the buffer 130. The unbalanced intermediate node 12-3 is never exposed by the snapshot API 134, and will be reclaimed by garbage collection.

As illustrated in FIG. 8, the user then deletes the last four characters from version 3 of the buffer. This involves getting the substring [0, 8], which can be implemented by creating 406 a new tree 314 from whose sequence the subsequence "IJKL" has been deleted. A traversal 420 to create 406 a new tree having as its sequence the substring [0, 8] starts operation on the version 3 root node, the 12-2 node, and recursively continues 418 to both the left and right children of the 12-2 node. The implementation then adds 436 a new intermediate node, the 8-2 node in FIG. 8, that concatenates the returned results 426. On the left side of the 12-2 node, the desired substring is [0, 5], which spans the entire 5-1 node, so the returned result 426 is the left child itself, the 5-1 node. On the right side of the 12-2 node, the desired substring is [0, 3] which is entirely contained in the left side of the 7-1 node, so the returned result 426 is found by recursively continuing 418 traversal by applying the substring operation to just the left child of the 7-1 node. The result of applying this substring operation to the FGHI leaf node adds 434 a new leaf node that has the span [0, 3] but references 430 the same unmodifiable source string "FGHI" as the original [0, 4] leaf node. In this example, the resulting CompositeString does not need to be rebalanced, and the new tree rooted at the 8-2 node becomes the content of version 4 of the buffer.

In connection with the examples illustrated by FIGS. 5 through 8, and in other embodiments, a leaf node may be viewed as holding the data elements that are in the span associated with the leaf node. The term "holding" allows data such as a string to actually be in the node, but in the examples of FIGS. 5 through 8 the leaf node holds the data elements via a pointer in the leaf node pointing to a span that contains the data elements. Spans could also contain links to their respective data elements.

In some embodiments, spans are part of their leaf nodes. However, that approach prevents sharing a reference to a span in the manner illustrated by the two leaf nodes that each reference 430 the FGHI span in FIG. 8.

In one embodiment, the leaf nodes contain only the data elements subsequence, with an implicit start of 0 and a length equal to the length of the subsequence. Thus, one of the leaf nodes in FIG. 8 would contain the string "FGHI" and the other would contain the string "FGH".

A leaf node capable of sharing a span may use a start-end pair specifying a start position and an end position for a data elements in the span, or a start-count pair specifying a start position and a data element count for the data elements in the span that are held by the leaf node. In FIGS. 5 through 8 the leaf nodes use start-count pairs. For instance, the first leaf node in FIG. 5 starts at string position 0 and goes for 3 elements, namely, A, B, and C. Keeping track of start-end or start-count pairs for a string is an optimization that helps reduce string copying, but some embodiments do not include this optimization.

In some embodiments it is possible for a single leaf node to correspond to multiple locations in the editable buffer. For instance, consider a scenario where a user copies the entire buffer and then pastes it at the end. An embodiment could create the new snapshot by creating an intermediate node where both the left and right children point to the subtree 316 that defined the original snapshot. The leaf nodes and all the intermediate nodes except for the root then correspond to two different sections of text in the user's view of the editable buffer.

CONCLUSION

Although particular embodiments are expressly illustrated and described herein as methods, configured media, or systems, it will be appreciated that discussion of one type of embodiment also generally extends to other embodiment types. For instance, the descriptions of methods in connection with FIG. 4 also help describe configured media, as well as the operation of systems and manufactures like those described in connection with FIGS. 1 through 3 and FIGS. 5 through 8. It does not follow that limitations from one embodiment are necessarily read into another. In particular, methods are not necessarily limited to the data structures and arrangements presented while discussing systems or manufactures such as configured memories.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A memory configured by storing data and instructions in a computing system which has a processor operable in communication with the memory, the configured memory comprising:
   an editable buffer;
   a snapshots data structure stored in the memory, including a directed acyclic graph (DAG) of node(s), and a first snapshot head identifying a first tree within the DAG, the first tree including leaf node(s) having unmodifiable span(s) that hold data element(s) representing a first snapshot of a first version of information that was resident in the buffer at a particular point in time regardless of subsequent editing of the buffer; and
   processor instructions stored in the memory and designed for creating a second snapshot head identifying a second tree within the DAG and for creating in the DAG a second tree whose leaf node(s) have span(s) whose data element(s) represent a second snapshot of a second version of information that was resident in the buffer including data element(s) that match one-to-one a subsequence of data element(s) held by span(s) of leaf node(s) of the first tree of the DAG, thereby storing in the DAG a plurality of snapshots comprising a plurality of versions of information that was in the editable buffer.

2. The configured memory of claim 1, wherein the data element(s) held by span(s) of leaf node(s) of the first tree form a sequence which has a beginning and an end, the subsequence also has a beginning and an end, and the processor instructions are designed for creating the second tree using a method which includes forming a partial copy of the first tree while making two deletions, namely:
   a pre-deletion corresponding to data element(s) between the beginning of the sequence and the beginning of the subsequence; and
   a post-deletion corresponding to data element(s) between the end of the subsequence and the end of the sequence.

3. The configured memory of claim 1, wherein the processor instructions are designed for recursively traversing the first tree to create the second tree as a logical copy of a subspan of the first tree, using a method which includes the following:
   when an intermediate node is reached:
      if the subsequence matches an entire span of the intermediate node then return the intermediate node as result and stop traversal;
      if the entire subsequence is held in span(s) of a subtree of the intermediate node then continue traversal only in that subtree; and
      if the subsequence is held in span(s) of multiple subtrees then continue traversal in each of those subtrees and concatenate results from those subtree traversals;

when a leaf node is reached, return as a result a new leaf node with a span that holds an intersection of the subsequence with the data elements held by the span of the leaf node that was reached.

4. The configured memory of claim 1, wherein a tree in the DAG shares at least one node with at least one other tree in the DAG.

5. The configured memory of claim 1, wherein two leaf nodes in the DAG each reference a same unmodifiable span of data elements.

6. A computer system comprising:
  a program;
  a memory which contains data in the form of a first snapshot of a first version of data elements in a buffer for the program and a second snapshot of a second version of data elements in the buffer for the program, the second snapshot generated at least in part by processor instructions which used a first binary tree of a directed acyclic graph (DAG) to create in the DAG a second binary tree for the second snapshot having unmodifiable leaf nodes with unmodifiable spans that hold data elements matching one-to-one a proper subsequence of data elements held by spans of leaf nodes of the first binary tree for the first snapshot, thereby storing in the DAG a plurality of snapshots comprising a plurality of versions of information that was in the buffer for the program; and
  at least one processor, in operable communication with the memory, which performed the processor instructions to create the second binary tree.

7. The computer system of claim 6, wherein the data elements held by spans of leaf nodes of the first binary tree form a sequence which has a beginning and an end, the subsequence also has a beginning and an end, and the snapshot was generated at least in part by forming a partial copy of the first binary tree while making two deletions, namely:
  a pre-deletion corresponding to data elements between the beginning of the sequence and the beginning of the subsequence; and
  a post-deletion corresponding to data elements between the end of the subsequence and the end of the sequence.

8. The computer system of claim 6, wherein the snapshot was generated at least in part by traversing the first binary tree to create the second binary tree in steps that include the following:
  when an intermediate node is reached:
    if the subsequence matches an entire span of the intermediate node then return the intermediate node as result and stop traversal;
    if the entire subsequence is held in spans of a left subtree of the intermediate node then continue traversal only in the left subtree;
    if the entire subsequence is held in spans of a right subtree of the intermediate node then continue traversal only in the right subtree; and
    if the subsequence is held in both the left subtree and the right subtree then continue traversal in each subtree and then concatenate results from the traversal in each subtree;
  when a leaf node is reached, return as a result a new leaf node with a span that holds an intersection of the subsequence with the data elements held by the span of the leaf node that was reached.

9. The computer system of claim 6, wherein a binary tree in the DAG shares at least one intermediate node with at least one other binary tree in the DAG.

10. The computer system of claim 6, wherein two of the leaf nodes each reference a same unmodifiable span of data elements.

11. The computer system of claim 6, wherein the data elements in the buffer represent user-generated text.

12. A storage medium configured with computer data and computer instructions for a method of providing access to snapshots of a text buffer without preventing buffer editing while a snapshot is in use, the method comprising:
  receiving an identification of a subsequence of data element(s) held by unmodifiable span(s) of leaf node(s) of a first tree of a directed acyclic graph (DAG), the first tree representing a first snapshot of a first version of information in the text buffer; and
  creating in the DAG a second tree which shares at least one unmodifiable leaf node with the first tree and whose leaf node(s) hold unmodifiable span(s) having textual data element(s) matching one-to-one the identified subsequence), the second tree representing a second snapshot of a second version of information in the text buffer, thereby storing in the DAG a plurality of snapshots comprising a plurality of versions of information that was in the text buffer.

13. The configured medium of claim 12, wherein the data element(s) held by span(s) of leaf node(s) of the first tree form a sequence which has a beginning and an end, the subsequence also has a beginning and an end, and the method comprises:
  performing a pre-deletion which excludes from the second tree data element(s) between the beginning of the sequence and the beginning of the subsequence; and
  performing a post-deletion which excludes from the second tree data element(s) between the end of the subsequence and the end of the sequence.

14. The configured medium of claim 12, wherein the first tree is a first binary tree, the second tree is a second binary tree, and the method comprises traversing the first binary tree and creating the second binary tree in steps that include the following:
  when an intermediate node is reached:
    if the subsequence matches an entire span of the intermediate node then return the intermediate node as result and stop traversal;
    if the entire subsequence is held in span(s) of a left subtree of the intermediate node then continue traversal only in the left subtree;
    if the entire subsequence is held in span(s) of a right subtree of the intermediate node then continue traversal only in the right subtree; and
    if the subsequence is held in both the left subtree and the right subtree then continue traversal in each subtree and then concatenate results from the traversal in each subtree; and
  when a leaf node is reached, return as a result a new leaf node with a span that holds an intersection of the subsequence with the textual data elements held by the span of the leaf node that was reached.

15. The configured medium of claim 12, wherein the method further comprises adding a new leaf node to the DAG, the new leaf node having a span holding at least one textual data element that is being appended to the text buffer.

16. The configured medium of claim 15, wherein the method further comprises pushing a buffer-append-operation onto an undo stack.

17. The configured medium of claim 12, wherein the method traverses the first tree of the DAG in conjunction with a copy-paste edit of the text buffer.

18. The configured medium of claim 12, wherein the method further includes identifying buffered text line break position(s) in at least one node.

19. The configured medium of claim 12, wherein the method further includes storing an aggregate line break count in at least one intermediate node.

20. The configured medium of claim 12, wherein the method traverses a tree of the DAG which shares a node with at least two other trees of the DAG.

* * * * *